United States Patent
Roh et al.

(10) Patent No.: US 7,844,884 B2
(45) Date of Patent: Nov. 30, 2010

(54) APPARATUS AND METHOD FOR PROCESSING BURSTS IN A WIRELESS COMMUNICATION SYSTEM

(75) Inventors: Jin-Woo Roh, Suwon-si (KR); Tae-Hong Park, Seoul (KR); Jae-Min Cho, Suwon-si (KR); In-Kwon Paik, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 987 days.

(21) Appl. No.: 11/654,912

(22) Filed: Jan. 18, 2007

(65) Prior Publication Data

US 2007/0189226 A1 Aug. 16, 2007

(30) Foreign Application Priority Data

Jan. 18, 2006 (KR) ............ 10-2006-0005423

(51) Int. Cl.
 *H03M 13/00* (2006.01)
(52) U.S. Cl. .................................. 714/776
(58) Field of Classification Search ........... 714/776
 See application file for complete search history.

(56) References Cited

U.S. PATENT DOCUMENTS

| | | | |
|---|---|---|---|
| 5,155,487 A | | 10/1992 | Tanaka et al. |
| 5,280,476 A | * | 1/1994 | Kojima et al. ............ 370/397 |
| 5,689,501 A | * | 11/1997 | Takase et al. ............ 370/244 |
| 5,809,012 A | * | 9/1998 | Takase et al. ............ 370/229 |
| 6,411,620 B1 | * | 6/2002 | Takase et al. ............ 370/390 |
| 6,728,921 B1 | * | 4/2004 | Bentall et al. ............ 714/758 |
| 6,804,804 B2 | * | 10/2004 | Gahan et al. ............ 714/748 |
| 6,876,671 B1 | | 4/2005 | Rambaud et al. |
| 7,020,209 B1 | | 3/2006 | Okumura |
| 7,233,594 B2 | | 6/2007 | Park et al. |
| 7,609,724 B1 | * | 10/2009 | Frederiks et al. ............ 370/473 |
| 2002/0001296 A1 | | 1/2002 | Lee et al. |
| 2005/0201416 A1 | | 9/2005 | Chang et al. |

FOREIGN PATENT DOCUMENTS

| | | |
|---|---|---|
| JP | 03-253136 | 11/1991 |
| JP | 04-356834 | 12/1992 |
| JP | 10-210021 | 8/1998 |
| JP | 11-298534 | 10/1999 |
| JP | 2001-028615 | 1/2001 |
| KR | 1020010095517 | 11/2001 |
| KR | 1020010112563 | 12/2001 |
| KR | 1020050063588 | 6/2005 |
| KR | 1020050091600 | 9/2005 |
| WO | WO 00/79720 | 12/2000 |
| WO | WO 2005/088878 | 9/2005 |

* cited by examiner

*Primary Examiner*—Joseph D Torres
(74) *Attorney, Agent, or Firm*—The Farrell Law Firm, LLP

(57) ABSTRACT

Disclosed is a method for processing a burst by a receiver in a wireless communication system having the burst, which includes at least one Protocol Data Unit (PDU). The method includes performing error checking of a first PDU header from among received bursts; performing error checking of a second PDU header when an error is detected in the first PDU header; and detecting the second PDU header by sequentially performing error checking from an address after the first PDU header when an error is detected in the second PDU header.

15 Claims, 5 Drawing Sheets

APPARATUS AND METHOD FOR PROCESSING BURSTS IN A WIRELESS COMMUNICATION SYSTEM

PRIORITY

This application claims the benefit under 35 U.S.C. §119(a) of an application filed in the Korean Industrial Property Office on Jan. 18, 2006 and assigned Serial No. 2006-5423, the contents of which are incorporated herein by reference.

BACKGROUND OF THE INVENTION

1. Field of the Invention

The present invention relates to a wireless communication system, and more particularly to an apparatus and a method for processing bursts.

2. Description of the Related Art

In a wireless communication system, user traffic information and communication protocol messages each include a plurality of packets, each of which has a format of a Protocol Data Unit (PDU) defined by a Medium Access Control (MAC) protocol. The PDU can be divided into a MAC header part for carrying information such as a structure, length, etc. of the PDU, and a payload part for carrying data. Each of the MAC header and the payload includes a Cyclic Redundancy Check (CRC) bit by which a receiver can detect errors.

Meanwhile, a burst refers to a bundle of one or more PDUs, and a frame refers to a bundle of one or more bursts. The receiver identifies a burst area in a frame and selectively processes only a PDU corresponding to itself.

FIG. 1 illustrates a structure of a burst including multiple PDUs in a typical wireless communication system. Referring to FIG. 1, the burst includes, for example, three PDUs. Each PDU includes a length field 110 indicating the length of the PDU, a Header Check Sequence (HCS) field 120 for error checking of a MAC header, a PDU payload field 130, and a Frame Check Sequence (FCS) field 140 for error checking of all of the PDUs. The length field 110 and the HCS field 120 belong to the MAC header part. The MAC header part may further include a header type field, a Connection Identifier (CID) field, a field in relation to encryption, etc. as well as the length field 110 and the HCS field 120.

When the receiver has received a burst as described above, the receiver recognizes the length of the first PDU 100 by referring to the length field 110 of the MAC header, and performs error checking and data processing for the corresponding PDU 100. This process can be also applied to the second and third PDUs. As described above, the receiver accumulates the length by referring to the length field 110 within the PDU MAC header, and finishes the PDU processing when the accumulated length reaches a length of one burst.

FIG. 2 is a flow chart illustrating a process in which a receiver processes bursts in a conventional wireless communication system. Referring to FIG. 2, the receiver first receives a frame from a transmitter in step 202. Then, in step 204, the receiver selects a burst corresponding to itself from among multiple bursts, and stores the selected burst. Then, in step 206, the receiver decodes a PDU MAC header. In step 208, the receiver checks if there is an error in the PDU MAC header, using the HCS field of the PDU. As a result of the checking, the receiver proceeds to step 216 when there is an error in the PDU MAC header, and proceeds to step 210 when an error is not detected in the PDU MAC header.

In step 210, the receiver normally processes the data because an error does not exist in the PDU MAC header. Then, in step 212, the receiver determines if there is another PDU other than the data-processed PDU. When there is another PDU other than the data-processed PDU, the receiver repeats the process by returning to step 204. However, when there are no more PDUs besides the data-processed PDU, the receiver proceeds to step 214. In step 214, the receiver determines if there is another burst to be processed. As a result of the determination, the receiver repeats the process by returning to step 206 when there is another burst to be processed, and ends the processing of the bursts when there are no more bursts to be processed.

Meanwhile, the determination in step 208 concludes that there is an error in the PDU MAC header, the receiver stops the processing of the entire burst including the erroneous PDU, and performs decoding of a next burst in step 216.

According to the conventional burst processing method as described above, when an error has occurred in a MAC header of a PDU, it is impossible to process the PDU any more. According to a result of measurement of the size of packets transmitted in a wireless communication system, packets having sizes smaller than 64 bytes occupy about 50% of all the packets, and packets having sizes smaller than 128 bytes occupy about 76% of all the packets. This implies that most of the transmitted packets are not large in size. According to an estimation based on such a result, a burst having a size of 1200 bytes includes about twelve PDUs. At this time, a MAC header occupies about 6% of overhead in a PDU. This implies that, when a burst has an error, it is highly probable that the MAC header part has the error. That is, due to the error in the PDU MAC header, the receiver cannot process the payload field, either. This may cause retransmission of bursts, which may degrade the efficiency in use of resources and the performance of the entire system.

SUMMARY OF THE INVENTION

Accordingly, the present invention has been made to solve the above-mentioned problems occurring in conventional systems, and an object of the present invention is to improve the efficiency of the entire system by finding a next PDU header location when a PDU header has an error.

In order to accomplish this object, there is provided a method for processing a burst by a receiver in a wireless communication system having the burst, which includes at least one Protocol Data Unit (PDU), the method including performing error checking of a $N^{th}$ PDU header from among received bursts; performing error checking of a $N+1^{th}$ PDU header when an error is detected in the $N^{th}$ PDU header; and detecting the $N+1^{th}$ PDU header by sequentially performing error checking from an address after the $N^{th}$ PDU header when an error is detected in the $N+1^{th}$ PDU header.

In accordance with another aspect of the present invention, there is provided a receiver apparatus for processing a burst in a wireless communication system having the burst, which includes at least one Protocol Data Unit (PDU), in which the receiver apparatus includes a header error checker for performing error checking of a $N^{th}$ PDU header or a $N+1^{th}$ PDU header in the received burst; and a controller for error checking of the $N+1^{th}$ PDU header when an error is detected in the $N^{th}$ PDU header, and sequential error checking from an address after the $N^{th}$ PDU header when an error is detected in the $N+1^{th}$ PDU header.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted when it may make the subject matter of the present invention rather unclear.

The present invention provides a method for processing the entire burst even when a Medium Access Control (MAC) header of a Protocol Data Unit (PDU) has an error in a wireless communication system.

In a PDU MAC header, a length field occupies a relatively low proportion of the entire size. For example, in the case of an OFDMA system, the size of the entire PDU MAC header is 48 bits, and the length field has a size of 11 bits. If the PDU MAC header has an error, a probability that the length field may have an error of about 23%.

Meanwhile, when a Cyclic Redundancy Check (CRC) is performed for a PDU MAC header from among the bursts received by a receiver according to the present invention, the following three cases may happen.

Figure 1:
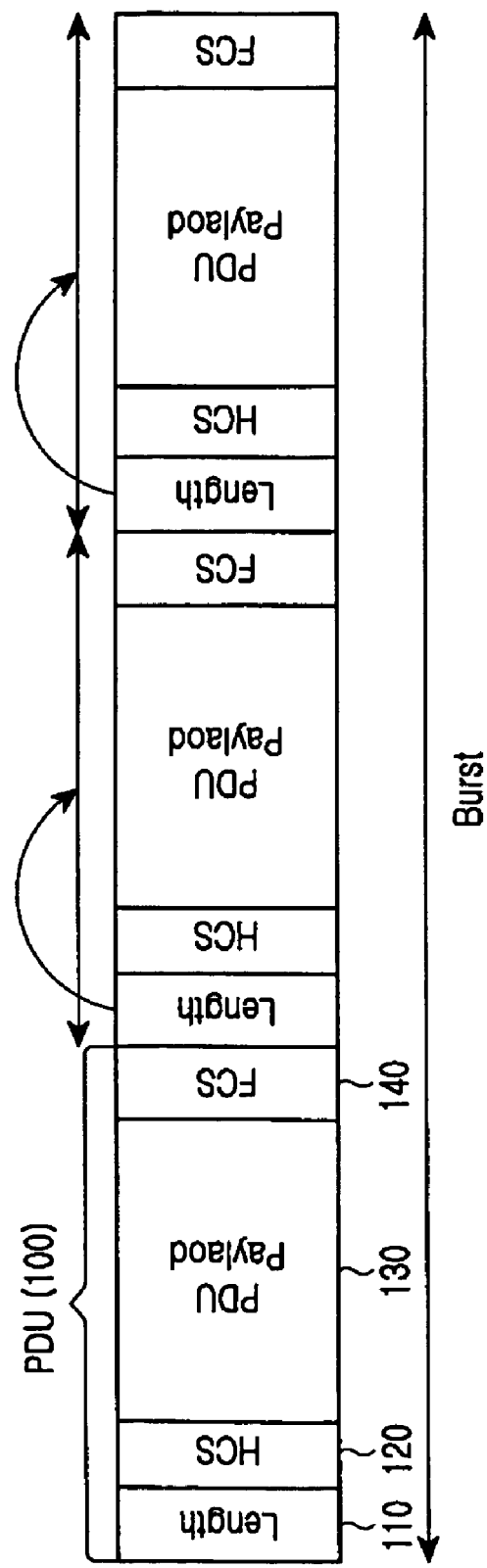
FIG. 1 illustrates a structure of a burst including multiple PDUs in a typical wireless communication system.
Figure 2:
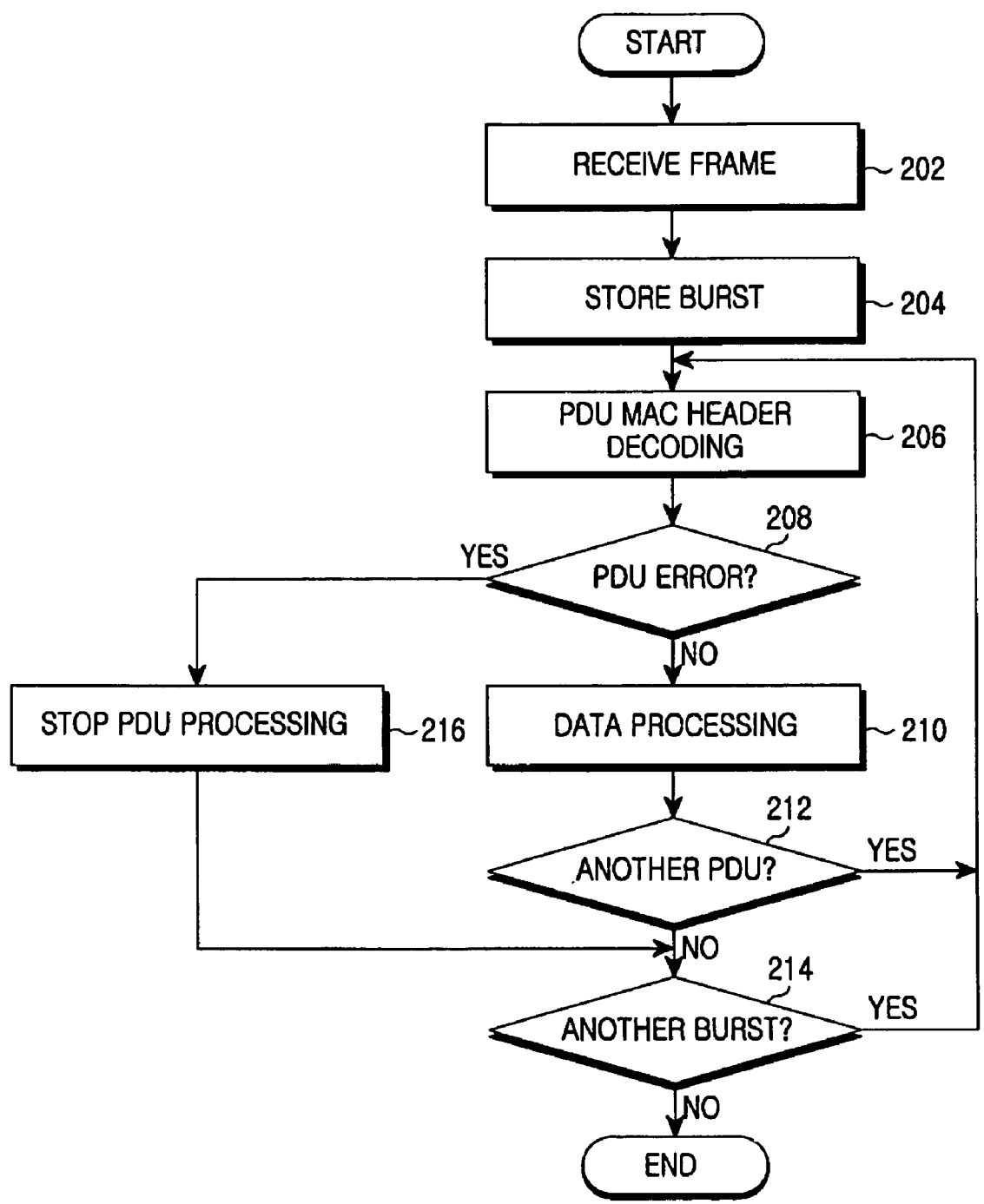
FIG. 2 is a flow chart illustrating a process in which a receiver processes bursts in a conventional wireless communication system.
Figure 3:
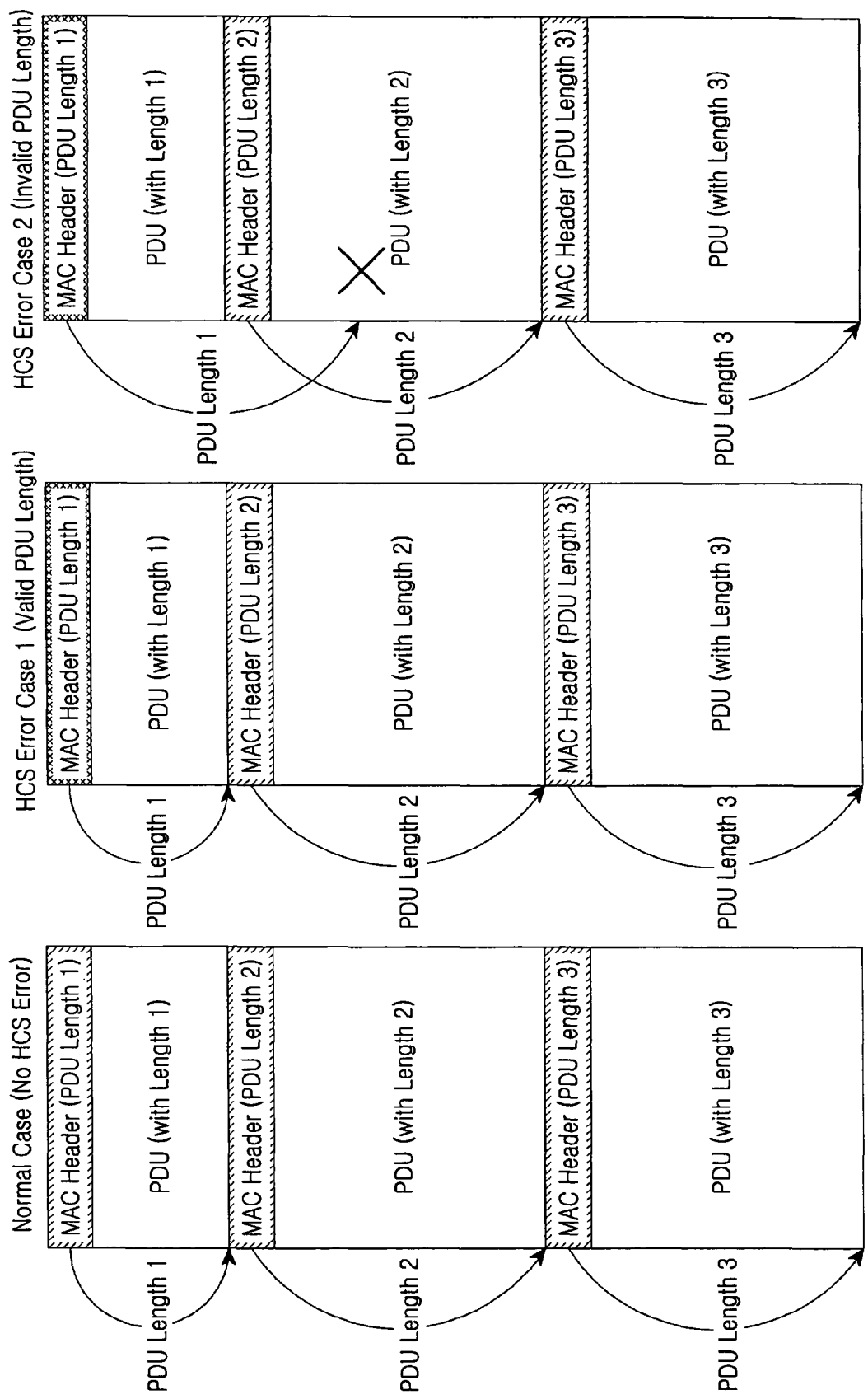
FIG. 3 illustrates a scenario which may occur during burst processing in a wireless communication system according to the present invention.

FIG. 3 illustrates a scenario which may occur during burst processing in a wireless communication system according to the present invention. According to the scenario shown in FIG. 3, three cases may occur during the burst processing.

First, when the first PDU MAC header is normal, the receiver processes data without any problem, and decodes a PDU MAC header thereafter.

Second, when an error has occurred in another field other than the length field from among the PDU MAC header, the receiver considers that an error has not occurred in the length field, jumps as long as the value indicated in the length field, and performs a CRC for the second PDU MAC header. According to the assumption of this case, because the length field of the first PDU MAC header is normal, it is possible to perform CRC or data processing for the MAC header of the second PDU.

Third, when an error has occurred in the length field of the first PDU MAC header, the receiver considers that the length field is without error, jumps as long as the value indicated in the length field, and performs CRC for the second PDU MAC header. In this case, because the length field of the PDU MAC header has an error, the probability is very low that the position after the jumping for as long as the value indicated in the length field may be a PDU MAC header.

Therefore, in the second case, although the receiver cannot perform data processing for the first PDU, it can perform data processing from the second PDU as long as there is not an error in the MAC header.

Further, in the third case, the receiver cannot perform data processing for both the first PDU and the second PDU. Therefore, in this case, a CRC checker (not shown) performs CRC checking while increasing a read address value from a payload field existing after the MAC header area of the first PDU, before no CRC error occurs. If an error is not detected during the checking, the receiver recognizes that the address at which an error is not detected is the MAC header of the second PDU, and performs a CRC checking for the MAC header of the second PDU.

Figure 4:
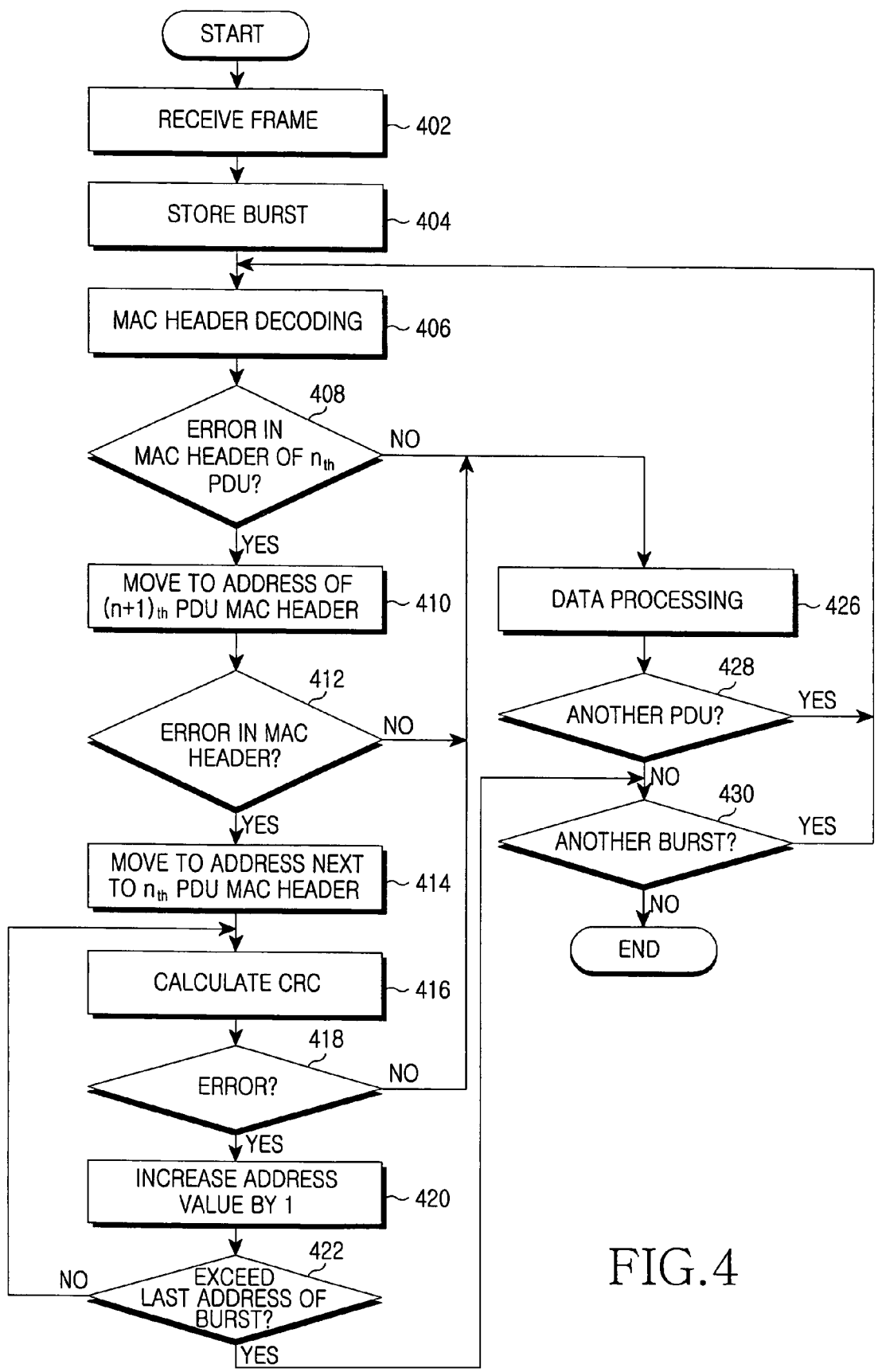
FIG. 4 is a flow chart illustrating a method of processing bursts by a receiver in a wireless communication system according to the present invention.

FIG. 4 is a flow chart illustrating a method of processing bursts by a receiver in a wireless communication system according to the present invention. Referring to FIG. 4, the receiver receives a frame from a transmitter in step 402. Then, in step 404, the receiver selects a burst corresponding to itself from among multiple bursts and stores the selected burst. Then, in step 406, the receiver decodes the $n^{th}$ PDU MAC header. In step 408, the receiver checks if the $n^{th}$ PDU MAC header has an error, using the HCS field of the $n^{th}$ PDU. As a result of checking, the receiver proceeds to step 410 when the MAC header has an error, and proceeds to step 426 when the MAC header does not have an error.

In step 410, the receiver jumps to a start address of the next PDU, which is estimated as the address of the $(n+1)^{th}$ PDU corresponding to a value obtained by adding the length field of the MAC header to the address of the MAC header of the $n^{th}$ PDU. Then, in step 412, the receiver checks if the MAC header has an error. As a result of the checking, the receiver proceeds to step 414 when the MAC header of the $(n+1)^{th}$ PDU also has an error, and proceeds to step 426 when the MAC header of the $(n+1)^{th}$ PDU does not have an error. Meanwhile, when an error is detected in the MAC header of the $n^{th}$ PDU in step 408, the error may have occurred either in the length field or outside of the length field. This is the same as described above for the second and third cases with reference to FIG. 3. Therefore, if the error detected in step 408 has occurred outside of the length field of the MAC header of the $n^{th}$ PDU, the receiver cannot detect an error in the MAC header of the $(n+1)^{th}$ PDU in step 412. However, if the error detected in step 408 has occurred in the length field of the MAC header of the $n^{th}$ PDU, the receiver will detect an error in the MAC header of the $(n+1)^{th}$ PDU in step 412.

Therefore, in step 414, in order to perform the error checking the receiver moves again from an address after the MAC header of the $n^{th}$ PDU. Then, in step 416, the receiver performs a CRC calculation for data corresponding to the length of the PDU MAC header and then proceeds to step 418. The error checking may be performed according to a serial scheme or parallel scheme, which will be described in further detail with reference to FIG. 5.

In step 418, the receiver determines if the detected address has an error. As a result of the checking, the receiver proceeds to step 420 when the detected address has an error, and proceeds to step 426 when the detected address does not have an error. In step 420, the receiver increases the address value by 1. The address value may be counted by the byte. In step 422, the receiver determines if the increased address value exceeds the last address value of the burst. When the increased address value exceeds the last address value of the burst, the receiver determines the corresponding burst to not be processible and therefore erroneous, and proceeds to step 430. However, when the increased address value does not exceed the last address value of the burst, the receiver repeats the process by returning to step 416. At this time, it is assumed that the receiver knows the entire length of the burst.

Hereinafter, steps 412 to 416 will be described in more detail. When the MAC header of the first PDU ($n^{th}$ PDU) has an error and the length field of the MAC header indicates an address of 0×100, the receiver jumps to the address of 0×100 and decodes 6 bytes of MAC header of the second PDU, that is, the $(n+1)^{th}$ PDU. The address of 0×100 refers to an address from which the MAC header of the $(n+1)^{th}$ PDU starts. The receiver checks if there is an error by decoding a MAC header corresponding to six bytes from the address of 0×100 in step 412. As a result of the checking, when an error is detected, the receiver recognizes that the length field of the MAC header of the $n^{th}$ PDU has an error, moves back to the address after the MAC header of the $n^{th}$ PDU, and then performs the CRC checking from the start address after the MAC header of the $-n^{th}$ PDU.

Meanwhile, in step 426, the receiver normally processes data. Then, in step 428, the receiver determines if there is another PDU. As a result of the determination, the receiver returns to step 406 when there is another PDU or proceeds to step 430 there are no more PDUs. In step 430, the receiver determines if there is another burst. As a result of the determination, the receiver returns to step 406 when there is another burst, and terminates the burst processing if there are no more bursts.

Figure 5:
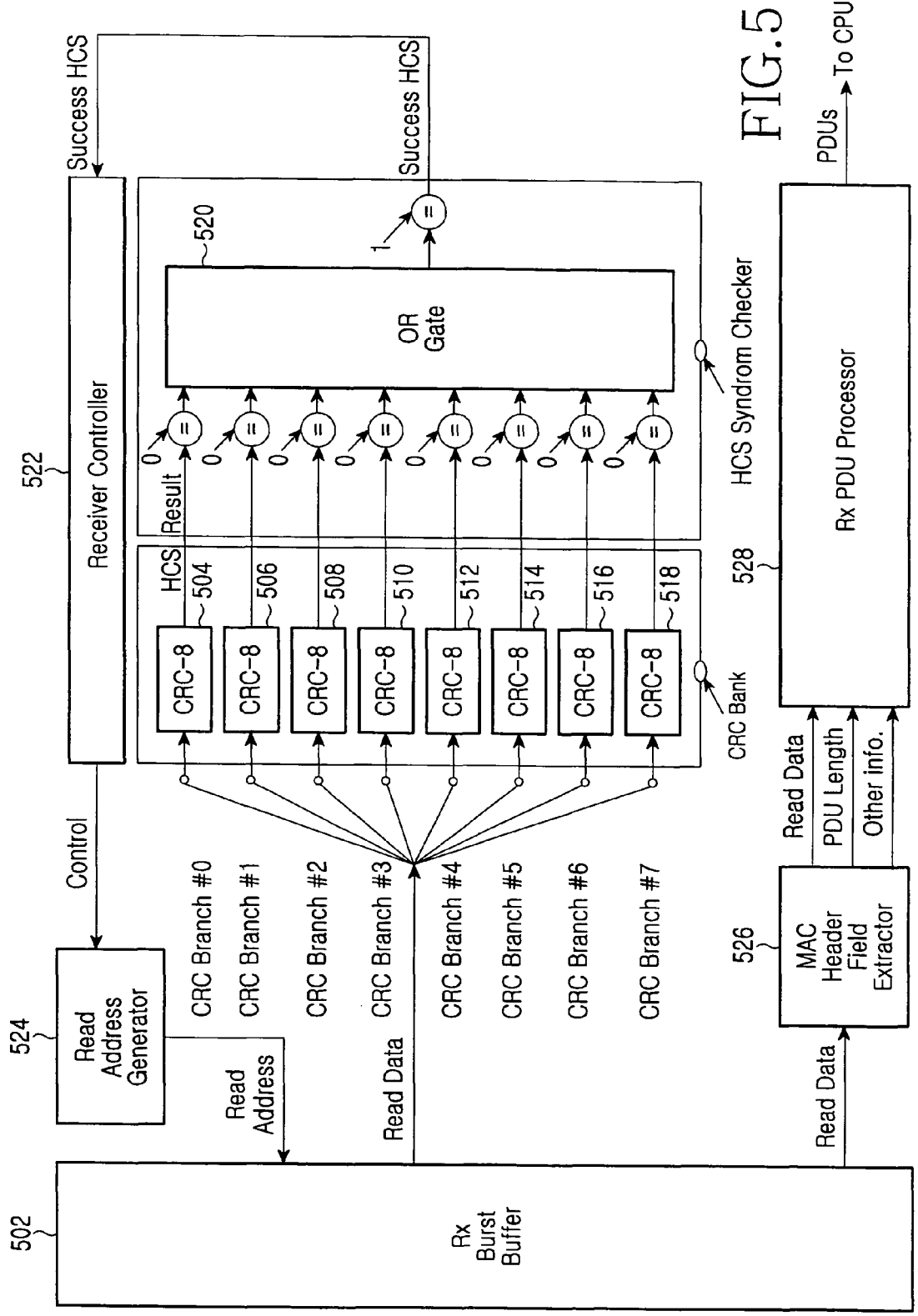
FIG. 5 illustrates a structure of a receiver apparatus for processing received bursts according to a preferred embodiment of the present invention.

FIG. 5 illustrates a structure of a receiver apparatus for processing received bursts according to the present invention. Referring to FIG. 5, the receiver stores the received bursts in a reception (RX) burst buffer 502. The receiver reads 6 bytes corresponding to the MAC header of the first PDU from among the stored bursts, and the read burst is input to a CRC-8 504, which is a MAC header error check unit. The CRC-8 504 performs error checking for the input burst, and outputs a result of the error checking to an OR gate 520. The operation of the CRC-8 504 is controlled by a receiver controller 522. That is, the receiver controller 522 controls a read address generator 524, so as to read a MAC header corresponding to six bytes while increasing the address value.

When the result of error checking concludes that an error does not exist, the output of the OR gate 520 is determined to be a success. When the output is a success, a MAC header field extractor 526 extracts the length of the PDU, data included in the PDU, and other information, and outputs them to a PDU processor 528. However, when the output of the OR gate 520 is determined to be a failure, the receiver controller 522 controls the read address generator 524 in order to jump to the start address of the MAC header of the next PDU. Thereafter, a burst corresponding to the start address of the MAC header of the second PDU is input again to the CRC-8 504. The CRC-8 504 performs error checking for a corresponding burst. As a result of the error checking, when there is an error, which implies that the error has occurred in the length field of the MAC header of the first PDU, the receiver controller 522 reads six bytes by six bytes from an address just after the MAC header of the first PDU.

Thereafter, the read bursts each having a size of six bytes are input in parallel to the CRC-8 504 to the CRC-8 518, and the receiver can find the MAC header start point of the second PDU when the error checking by the CRC-8 504 to the CRC-8 518 has a result determined to be a success.

Meanwhile, when the length of the received burst is longer than the accumulated length of the processed PDUs by more than six bytes, which corresponds to a minimum length of a PDU, the burst processing is continued. In contrast, when the exceeding burst length difference is less than or equal to six bytes, the processing of the corresponding burst is terminated.

In a wireless communication system according to the present invention as described above, even when an error occurs in a MAC header of a PDU, it is possible to successively find a start point of a MAC header of the next PDU. Therefore, the present invention can improve the PDU processing performance in comparison with the conventional method in which a burst having an erroneous MAC header is simply discarded.

While the invention has been shown and described with reference to certain preferred embodiments thereof, it will be understood by those skilled in the art that various changes in form and details may be made therein without departing from the spirit and scope of the invention, as defined by the appended claims.

What is claimed is:

1. A method for processing a burst by a receiver in a wireless communication system having the burst, which includes at least one Protocol Data Unit (PDU), the method comprising the steps of:
   checking if an $N^{th}$ PDU header included in a received burst has an error;
   if the $N^{th}$ PDU header has an error, estimating an address of the $N+1^{th}$ PDU header;
   checking if an $N+1^{th}$ PDU header has an error using the estimated address of the $N+1^{th}$ PDU header;
   if the $N+1^{th}$ PDU header does not have an error, decoding the $N+1^{th}$ PDU header, and processing an $N+1^{th}$ PDU by using information of the decoded $N+1^{th}$ PDU header; and
   if the $N+1^{th}$ PDU header has an error, detecting the $N+1^{th}$ PDU header by checking if addresses after the $N^{th}$ PDU header have an error,
   wherein the address of the $N+1^{th}$ PDU header is estimated by adding a length field value included in the $N^{th}$ PDU header to an address of the $N^{th}$ PDU header.

2. The method as claimed in claim 1, further comprising decoding the detected $N+1^{th}$ PDU header, and processing the $N+1^{th}$ PDU by using information of the decoded $N+1^{th}$ PDU header.

3. The method as claimed in claim 1, wherein a start address of an $N+2^{th}$ PDU header is recognized with reference to a length field value included in the $N+1^{th}$ PDU header.

4. The method as claimed in claim 1, further comprising:
   if the $N^{th}$ PDU header does not have an error, decoding the $N^{th}$ PDU header; and
   processing an $N^{th}$ PDU by using information of the decoded $N^{th}$ PDU header.

5. The method as claimed in claim 1, wherein the step of checking if addresses after the $N^{th}$ PDU header have an error comprises sequentially checking if the addresses after the $N^{th}$ PDU header have an error or simultaneously checking if the addresses after the $N^{th}$ PDU header have an error.

6. The method as claimed in claim 5, wherein the step of sequentially checking if the addresses after the $N^{th}$ PDU header have an error comprises:
   increasing the address of the $N^{th}$ PDU header by 1;
   determining if the increased address exceeds a last address of the received burst; and
   if the increased address does not exceed the last address of the received burst, checking if data corresponding to the increased address has an error.

7. The method as claimed in claim 1, wherein the step of detecting the $N+1^{th}$ PDU header comprises:
   if the $N+1^{th}$ PDU header has an error, detecting the $N+1^{th}$ PDU header by determining an address which does not have an error among the addresses after the $N^{th}$ PDU header, as the address of the $N+1^{th}$ PDU header.

8. A receiver apparatus for processing a burst in a wireless communication system having the burst, which includes at least one Protocol Data Unit (PDU), the receiver apparatus comprising:

a header error checker for checking if an $N^{th}$ PDU header or an $N+1^{th}$ PDU header in a received burst has an error; and a controller for controlling the header error checker to check if the $N^{th}$ PDU header has an error and to check if the $N+1^{th}$ PDU header has an error, if the $N^{th}$ PDU header has an error, estimating an address of the $N+1^{th}$ PDU header, checking if the $N+1^{th}$ PDU header has an error using the estimated address of the $N+1^{th}$ PDU header and if the $N+1^{th}$ PDU header does not have an error, decoding the $N+1^{th}$ PDU header and processing an $N+1^{th}$ PDU by using information of the decoded $N+1^{th}$ PDU header, and if the $N+1^{th}$ PDU header has an error, detecting the $N+1^{th}$ PDU header by checking if addresses after the $N^{th}$ PDU header have an error, wherein the address of the $N+1^{th}$ PDU header is estimated by adding a length field value included in the $N^{th}$ PDU header to an address of the $N^{th}$ PDU header.

9. The receiver apparatus as claimed in claim 8, further comprising a read address generator for generating read address values corresponding to addresses of the $N^{th}$ PDU header and the $N+1^{th}$ PDU header.

10. The receiver apparatus as claimed in claim 8, wherein the controller decodes the detected $N+1^{th}$ PDU header, and processes the $N+1^{th}$ PDU by using information of the decoded $N+1^{th}$ PDU header.

11. The receiver apparatus as claimed in claim 8, wherein a start address of an $N+2^{th}$ PDU header is recognized with reference to a length field value included in the $N+1^{th}$ PDU header.

12. The receiver apparatus as claimed in claim 8, wherein, if the $N^{th}$ PDU header does not have an error, the controller decodes the $N^{th}$ PDU header, and processes an $N^{th}$ PDU by using information of the decoded $N^{th}$ PDU header.

13. The receiver apparatus as claimed in claim 8, wherein the header error checker sequentially checks if the addresses after the $N^{th}$ PDU header have an error, or if at least two header error checkers are provided, the at least two header error checkers simultaneously check if the addresses after the $N^{th}$ PDU header have an error.

14. The receiver apparatus as claimed in claim 13, wherein, when the header error checker sequentially checks if the addresses after the $N^{th}$ PDU header have an error, the controller increases the address of the $N^{th}$ PDU header by 1, determines if the increased address exceeds a last address of the received burst, and if the increased address does not exceed the last address of the received burst, checking if a data corresponding to the increased address has an error.

15. The receiver apparatus as claimed in claim 8, wherein, if the $N+1^{th}$ PDU header has an error, the controller detects the $N+1^{th}$ PDU header by determining an address which does not have an error among the addresses after the $N^{th}$ PDU header, as the address of the $N+1^{th}$ PDU header.

* * * * *